Sept. 16, 1952 A. C. DE NAPOLI, JR 2,611,037
DICTATING MACHINE WITH COMBINED HAND MICROPHONE AND CONTROL MEANS
Filed April 28, 1949 3 Sheets-Sheet 2
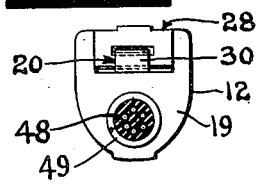
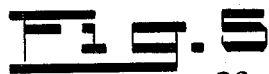
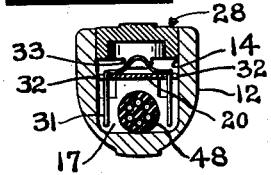
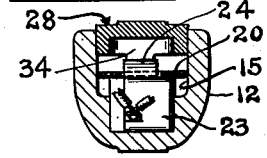
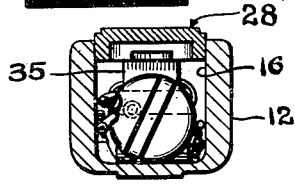
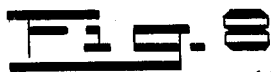
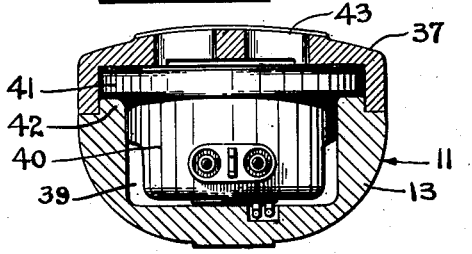
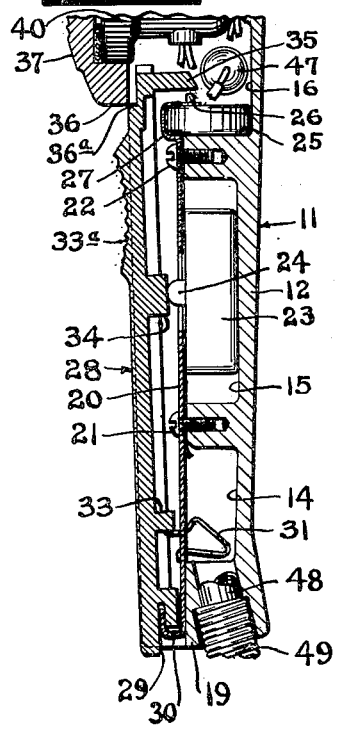
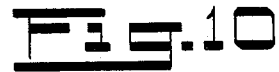
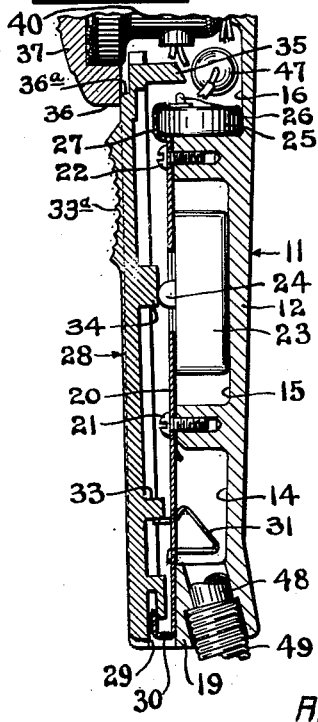
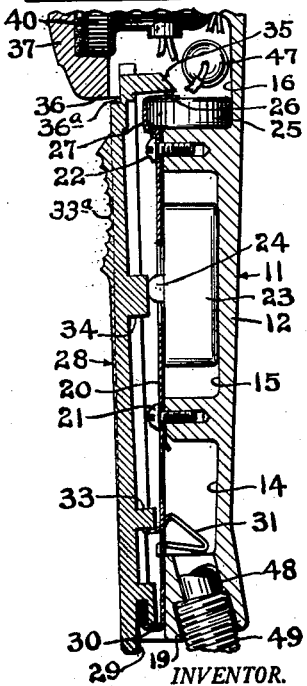
INVENTOR.
ANTHONY C. DE NAPOLI, JR.
BY
H. G. Manning
ATTORNEY Sept. 16, 1952 A. C. DE NAPOLI, JR 2,611,037
DICTATING MACHINE WITH COMBINED HAND MICROPHONE AND CONTROL MEANS
Filed April 28, 1949 3 Sheets-Sheet 3

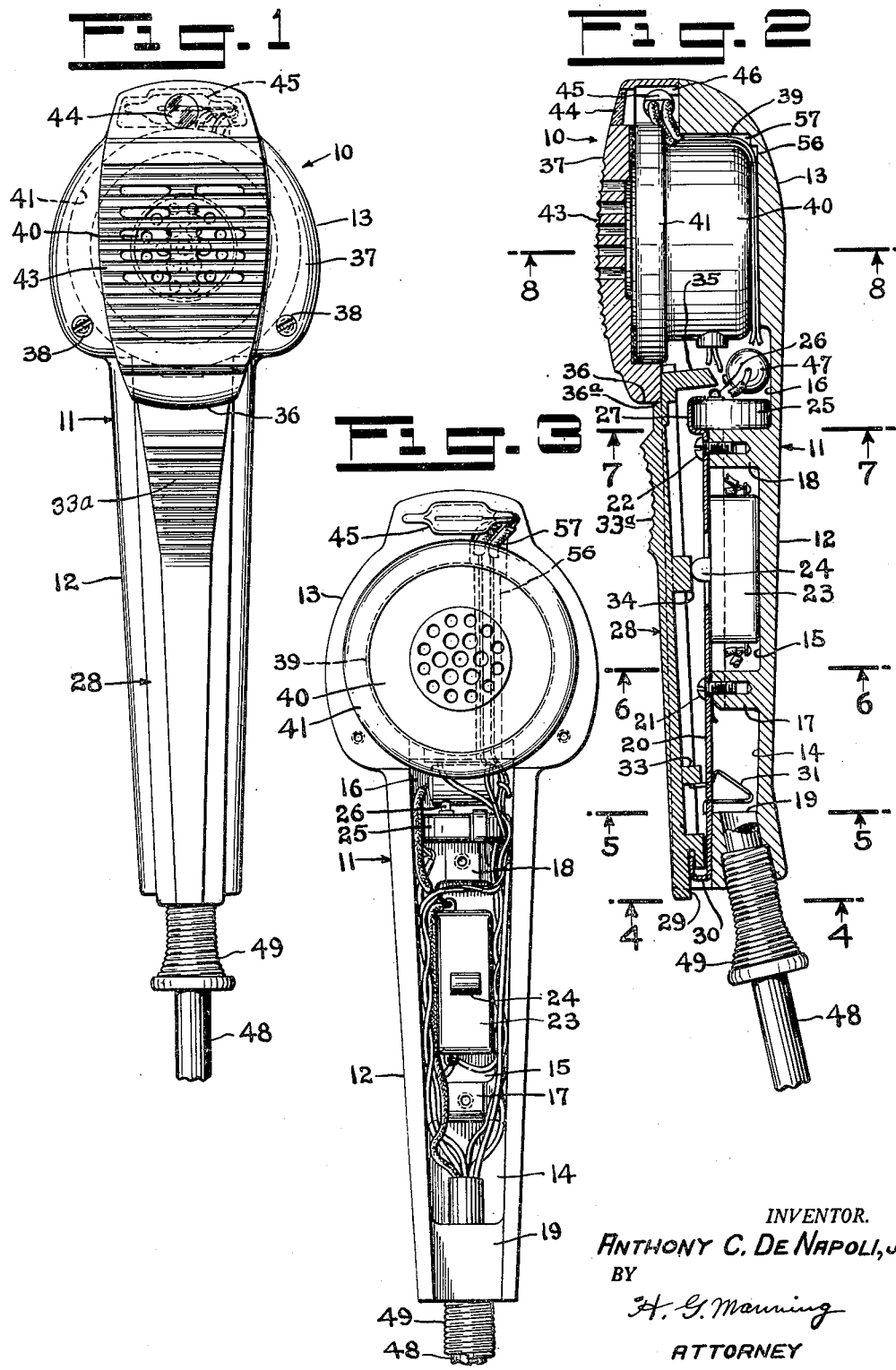

INVENTOR.
ANTHONY C. DE NAPOLI, JR.
BY H. G. Manning
ATTORNEY

Patented Sept. 16, 1952

2,611,037

UNITED STATES PATENT OFFICE 2,611,037

DICTATING MACHINE WITH COMBINED HAND MICROPHONE AND CONTROL MEANS

Anthony C. De Napoli, Jr., Windsor, Conn., assignor to The Soundscriber Corporation, New Haven, Conn., a corporation of Connecticut Application April 28, 1949, Serial No. 90,176

12 Claims. (Cl. 179—100.1)

This invention relates to phonographic apparatus, and more particularly to a portable hand microphone instrument which is adapted to serve also as a sound reproducer, and which has means for controlling the operation of a dictating machine to which it is connected.

One object of this invention is to provide an apparatus of the above nature wherein a single lever is adapted to operate both a switch for controlling a turntable motor, and a switch for controlling the selective operation of a recording and playback apparatus in the dictating machine.

Another object is to provide an apparatus of the above nature which will permit portions of a recording to be played back as desired during the course of a recording operation, without requiring that the operator direct his attention to the dictating machine.

Another object is to provide an instrument of the above nature having a lamp which is so connected as to indicate whether the dictating machine is in condition to record dictation.

Another object is to provide a dictating machine having recording and playback apparatus in combination with a portable microphone instrument having means for controlling said apparatus.

A further object is to provide an apparatus of the above nature which will be simple in construction, inexpensive to manufacture, easy to install and manipulate, ornamental in appearance, and very efficient and durable in use.

With these and other objects in view, there have been illustrated on the accompanying drawing two forms in which the invention may be embodied in practice.

In the drawing,

Fig. 1 is a front view of the improved hand microphone instrument.

Fig. 2 is a longitudinal sectional view of the same, taken on a plane at right angles to Fig. 1, showing the actuating lever in its "off" position, and showing the indicator lamp, the transducer unit, the selector switch, and the motor switch.

Fig. 3 is a front view of the same with the actuating lever, the microphone cap, and the retaining plate removed.

Fig. 4 is a cross-sectional view, taken from the line 4—4 of Fig. 2.

Fig. 5 is a cross-sectional view on the line 5—5 of Fig. 2.

Fig. 6 is a cross-sectional view on the line 6—6 of Fig. 2.

Fig. 7 is a cross-sectional view on the line 7—7 of Fig. 2.

Fig. 8 is a cross-sectional view on the line 8—8 of Fig. 2.

Fig. 9 is a fragmentary longitudinal sectional view, similar to Fig. 2, but showing the actuating lever pressed inwardly to an unlatched recording position.

Fig. 10 is a fragmentary longitudinal sectional view, similar to Fig. 2, but showing the actuating lever pressed inwardly and slid upwardly to latched recording position.

Fig. 11 is a fragmentary longitudinal sectional view, similar to Fig. 2, but showing the actuating lever pressed inwardly and slid downwardly to playback position.

Figure 12:
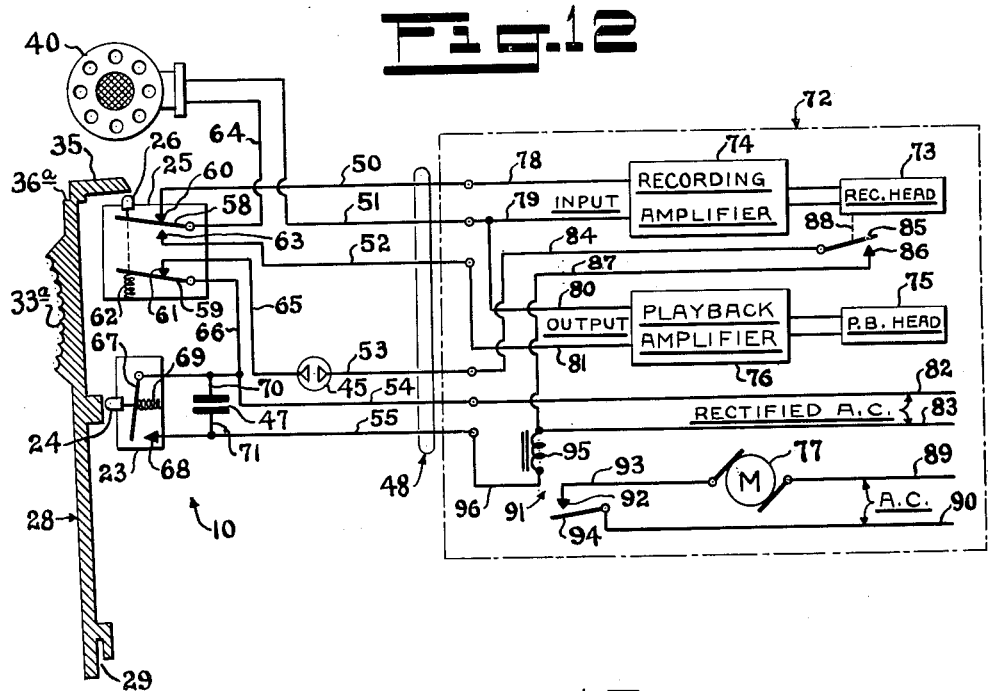
Fig. 12 is a circuit diagram showing how the microphone instrument would be connected to a dictating machine having two amplifiers.

Referring now to the drawings in which like reference numerals denote corresponding parts throughout the several views, the improved hand microphone instrument is indicated generally by the numeral 10, and comprises a body member 11 having an elongated channel-shaped handle portion 12, and a rounded head 13 at one end of said handle portion. The interior of the handle portion 12 is divided into a lower cavity 14, a middle cavity 15, and an upper cavity 16 by means of lower and upper transverse partitions 17, 18, respectively, and is provided with an apertured wall 19 at its lower end.

The outer edges of the lower partition 17, the upper partition 18, and the end wall 19 lie in a common plane which is disposed at an intermediate point in the depth of the channel-shaped portion 12, and support a flat retaining plate 20 which is secured to the lower and upper transverse partitions 17, 18 by means of screws 21, 22.

A rectangular turntable motor switch 23 is retained in the middle cavity 15 by means of the plate 20, and is provided with an outwardly-extending operating button 24, which is disposed in an opening in said plate.

Provision is also made of a circular selector switch 25, which has an upwardly-extending operating button 26 and which is held in the lower portion of the upper cavity 16 and upon the upper transverse partition 18 by means of a U-shaped bracket portion 27 at the upper end of the retaining plate 20.

The motor switch 23 and the selector switch 25 (to be further described hereinafter) are preferably sensitive switches of the snap action "micro" type, and are adapted to be operated by means of an elongated actuating lever 28 which is so disposed outwardly of the retaining plate 20 as to serve as a closure for the open side of the channel-shaped handle portion 12.

The actuating lever 28 has a vertically slotted lower end 29 which is movably engaged with a hooked lower end 30 of the retaining plate 20 in such a manner as to retain the lower portion of the lever 28 in the handle portion 12, while permitting limited horizontal swinging and vertical sliding movement of the actuating lever 28. The lever 28 is normally urged upwardly to a neutral position by means of an angular spring 31 which is supported in a pair of slots 32 in the edges of the retaining plate 20 (Fig. 5) and which engages the lower surface of a lug 33 integrally formed upon the inner side of the lever 28.

In order to facilitate operation of the actuating lever 28, the outer side thereof is provided with a serrated concave surface portion 33a which is adapted to be engaged by the user's thumb.

The motor switch 23 is adapted to be operated by means of a lug 34 which is integrally formed upon a central portion of the inner surface of the actuating lever 28, and which is engageable with the switch operating button 24. It will be noted that the lug 34 is of a sufficient longitudinal extent as to be engageable with the operating button 24 at any point in the vertical sliding movement of the actuating lever 28, so that the motor switch 23 may always be operated by pressing the lever 28 inwardly without regard to the longitudinal position of said lever.

In order to operate the selector switch 25, the upper end of the actuating lever 28 is provided with an inwardly-extending nose 35 which overhangs the operating button 26. The actuating lever 28 is so proportioned that when said lever 28 is slid to its lowermost position, as shown in Fig. 11, the switch-operating button 26 will be depressed, while in all other positions of the actuating lever 28 the nose 35 will be raised so as to release the button 26.

Thus, it will be seen that while the operator presses the actuating lever 28 inwardly to maintain the motor switch operating button 24 depressed, the selector switch operating button 26 may be selectively pressed or released depending upon the longitudinal position of the lever 28.

In order to limit outward movement of the actuating lever 28, and thus prevent its separation from the handle portion 12, provision is made of a downwardly-extending lip 36 which is integrally formed upon a hollow microphone cap 37 secured to the head 13 by means of a pair of screws 38.

The lip 36 is adapted to engage the outer face of the inwardly-extending nose 35 when the actuating lever 28 is in its outermost or "off" position, in which the motor switch operating button 24 and the selector switch operating button 26 are both released, as shown in Fig. 2. When the operator wishes to actuate the motor switch 23 without actuating the selector switch 25, he will merely depress the actuating lever 28 inwardly against the force of the switch button 24 so that the parts will assume the position shown in Fig. 9.

Provision is also made of an outwardly-offset shoulder 36a at the upper end of the lever 28, which may be engaged under the lip 36 by sliding said lever upwardly to the position shown in Fig. 10, so that the motor switch operating button 24 will be held depressed without further attention on the part of the operator.

The head 13 of the body member 11 is provided with a circular cavity 39 (Figs. 2 and 8), which joins the upper cavity 16 and contains a microphone unit 40 of a dynamic type which is adapted to serve also as a sound reproducer, and will be referred to hereinafter as a transducer unit. The transducer unit 40 is provided with an outer peripheral flange 41 which is disposed within the hollow microphone cap 37 and is seated upon a raised edge 42 of the head 13 (Fig. 8).

The microphone cap 37 has a slotted central grille portion 43 to facilitate the passage of sound to and from the transducer unit 40, and is also provided with an upper window 44 to permit observation of an indicator lamp 45 which is disposed in a transverse cavity 46 in the cap 37 above the transducer unit 40.

If desired, the microphone instrument 10 may also be provided with an "anti-click" motor switch condenser 47 which is disposed in the upper cavity 16 above the selector switch 25. The instrument 10 is also provided with a cable 48, which enters the instrument through a strain-relief device 49 secured in the apertured end wall 19, and which has six conductors 50, 51, 52, 53, 54, and 55, which will be further described hereinafter in connection with Fig. 12.

The edges of the lower and upper transverse partitions 17, 18 are notched in order to permit the conductors to extend upwardly to the motor switch 23, the selector switch 25, the condenser 47, the transducer unit 40, and the indicator lamp 45, as shown in Fig. 3. Bottom and side channels 56, 57 (Fig. 2) are also provided in the head 13 in order to permit a pair of the conductors to extend to the indicator lamp 45.

As shown in Fig. 12, the selector switch 25 is provided with a pair of movable switch arms 58, 59 which are urged against respective contacts 60, 61, by means of a spring 62 and are adapted to be disengaged from said contacts when the operating button 26 is depressed.

The selector switch 25 is also provided with a contact 63 which is connected to the wire 52 and which is adapted to be engaged by the switch arm 58 when the operating button 26 is depressed. The transducer unit 40 is connected to the wire 51 and is also connected to the movable switch arm 58 by means of a wire 64, whereby the transducer unit 40 may be switched selectively between the wire 50 and the wire 52.

The contact 61 of the selector switch 25 is connected to the indicator lamp 45 by means of a wire 65, said lamp being connected also to the wire 53 of the cable 48. The switch arm 59 is connected to the wire 54 by means of a wire 66, whereby a circuit may be completed from the wire 53 through the indicator lamp 45 to the wire 54.

The motor switch 23 comprises a movable switch arm 67 which is adapted to engage a contact 68 when the operating button 24 is depressed, but is normally urged away from said contact by means of a spring 69.

The switch arm 67 and the contact 68 are connected respectively to the wires 54, 55 of the cable 48 and the condenser 47 is connected across the wires 54, 55 by means of wires 70, 71.

The microphone instrument 10 is adapted to be used in connection with a dictating machine 72 having a recording head 73 connected to the output of a recording amplifier 74, a playback head 75 connected to the input of a playback amplifier 76, and a motor 77 for driving a turntable or other record operating means.

The input of the recording amplifier 74 is connected to the wires 50, 51 by wires 78, 79, respectively, while the output of the playback amplifier 76 is connected to the wires 51, 52, by wires 80, 81, respectively.

Thus, it will be seen that the transducer unit 40 may be selectively connected either to the input of the recording amplifier 74 so as to serve as a microphone, or to the output of the playback amplifier 76 so as to serve as a sound reproducer, depending upon the position of the switch arm 58 in the selector switch 25.

In order to energize the indicator lamp 45 and other apparatus which will be described hereinafter, the dictating machine 72 is provided with a pair of wires 82, 83, which are supplied with rectified alternating current from any suitable source. The wire 82 is adapted to be connected to the wire 54, thus connecting the indicator lamp 45 to the wire 82 through the selector switch 25 whenever the operating button 26 is released so as to permit the switch arm 59 to engage the contact 61, the transducer unit 40 being connected to the recording amplifier 74 at the same time.

The circuit of the indicator lamp 45 is completed by means of a wire 84 connecting the wire 53 to a switch arm 85 adapted to engage a contact 86 which is connected to the wire 83 by means of a wire 87. A mechanical connection 88 is provided between the switch arm 85 and the recording head 73, said connection being so arranged as to engage the switch arm 85 with the contact 86 when the recording head 73 is placed in operating position upon the surface of a record, and to disengage said switch arm from said contact when the recording head is disengaged from the record. In normal practice, the switch arm 85 may be actuated in conjunction with recording head operating mechanism such as is shown in the patent to Lincoln Thompson, No. 2,250,242, issued July 22, 1941, entitled "Disk Dictating Machines."

In order to provide power for the turntable motor 77, the dictating machine 72 is provided with a pair of wires 89, 90 which are supplied with alternating current from any suitable source, the wire 89 being connected directly to one side of the motor 77. The circuit is adapted to be completed through the motor 77 by means of a relay 91 having a contact 92 which is connected to the motor 77 by means of a wire 93, and a swingable relay arm 94 which is connected to the wire 90.

The relay 91 also includes a coil 95 for operating the relay arm 94, said coil being connected at one side to the wire 83, and at the other side to the wire 55 of the microphone 10 by means of a wire 96. Thus, the relay 91 is adapted to be energized by the rectified alternating current carried by the wires 82, 83, when the actuating lever 28 of the instrument 10 is pressed inwardly, so as to engage the motor switch arm 67 with the contact 68.

Operation

When the instrument 10 and the dictating machine 72 are in condition for operation, the recording head 73 will be operatively engaged with a record member, whereupon the mechanical connection 88 will close the switch arm 85 against the contact 86 so that the indicator lamp 45 will be controlled by movements of the switch arm 61 in the selector switch 25. When the operator wishes to dictate, he will merely press the actuating lever 28 inwardly to the position shown in Fig. 9, in which the operating button 24 of the motor switch 23 is depressed so as to close the switch arm 67 against the contact 68, and thus energize the relay 91 and operate the turntable motor 77.

In this position of the actuating lever 28 (Fig. 9), the button 26 of the selector switch 25 will, of course, be in a released position so that the spring 62 will hold the switch arms 58 and 59 against the contacts 60, and 61, respectively. Thus the transducer unit 40 will be operatively connected as a microphone to the recording amplifier 74, and will cause the recording head 73 to produce a suitable sound track upon a record driven by the motor 77.

The indicator lamp 45 will also be illuminated, thus showing the operator that the dictating machine is in condition circuit-wise to receive dictation. The dictating machine 72 will, of course, continue to operate as a recorder as long as the operator holds the actuating lever 28 inwardly, in the position shown in Fig. 9.

However, if the operator should wish to be relieved of the necessity of holding the actuating lever 28 inwardly during the recording operation, as for example during a prolonged period of dictation, or if he should desire to lay the instrument 10 down while dictating, he will merely slide the actuating lever 28 upwardly into the position shown in Fig. 10.

In this position, the shoulder 36a of the lever 28 will be engaged under the lip 36, thus holding the operating button 24 in and maintaining the switch arm 67 of the motor switch 23 in engagement with the contact 68. It will be understood that the various elements of the apparatus will be in the same operating condition when the actuating lever 28 is in the position shown in Fig. 10, as when said lever is in the position shown in Fig. 9, excepting only that Fig. 9 shows the actuating lever 28 as it would be manually held in recording position, while Fig. 10 shows said lever latched in recording position.

If the operator should desire to play back any portion of the recorded material, he will hold the actuating lever 28 inwardly while sliding it downwardly to the position shown in Fig. 11.

The motor 77 will then be maintained in operation inasmuch as the operating button 24 of the motor switch 23 will be depressed in the same manner as during the recording operation. However, the inwardly-extending nose 35 of the actuating lever 28 will now depress the operating button 26 of the selector switch 25, thus transferring the switch arm 58 from the contact 60 to the contact 63, and connecting the transducer unit 40 as a reproducer to the output of the playback amplifier 76.

When the transducer unit 40 is connected as a reproducer, the switch arm 59 will of course be disengaged from the contact 61, thus extinguishing the indicator lamp 45 to warn the operator that the dictating machine 72 is not in condition for recording.

Modified form

Figure 13:
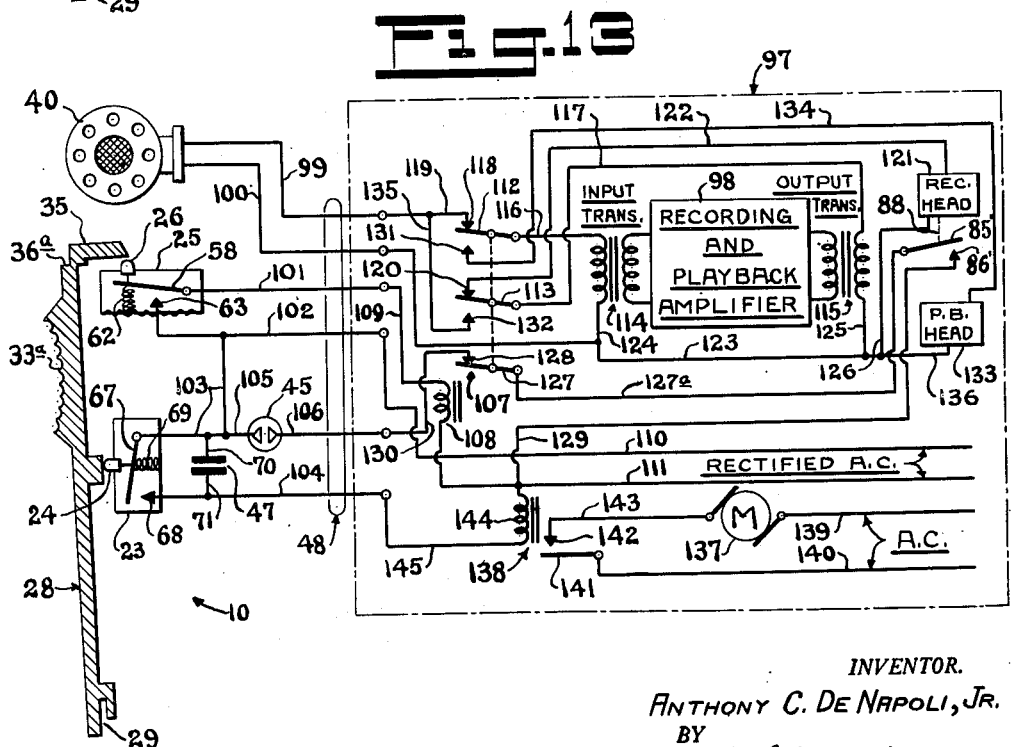
Fig. 13 is a circuit diagram showing how the internal circuits of the microphone instrument would be modified with the use of a dictating machine having a single recording and playback amplifier.

The hand instrument 10 may be adapted for use with a dictating machine 97 having a single recording and playback amplifier 98 merely by modifying the electrical circuits within said instrument as shown in Fig. 13.

In the modified form, the transducer unit 40 is connected directly to a pair of wires 99, 100, leading from the microphone instrument 10 in the cable 48; and the switch arm 58 and the contact 63 in the selector switch 25 are respectively connected to wires 101, 102 in said cable.

The contacts 60, 61 and the switch arm 59 of the selector switch 25 are not used in the modified form, and it will be understood that the switch 25 may, if desired, be replaced with a switch having a single-pole single-throw structure.

The switch arm 67 of the motor switch 23 is connected to the wire 102 by means of a wire 103 within the instrument 10, while the contact 68 is connected to a wire 104 of the cable 48. One side of the indicator lamp 45 is connected to the wire 103 by means of a wire 105, while the other side of said lamp is connected to a wire 106 of the cable 48.

The anti-click condenser 47 is connected across the motor switch 23 by means of wires 70, 71, which join the wires 103, 104, respectively.

In order to permit the operation of the recording and playback amplifier 98 to be controlled by the instrument 10, the dictating machine 97 is provided with a three-pole relay 107 having an actuating coil 108, one side of which is connected to the selector switch wire 101 by means of a wire 109. The other side of the actuating coil 108, and the other selector switch wire 102 are connected to a suitable source of rectified alternating current by means of a pair of wires 111, 110, respectively, thus placing the relay 107 under the control of the selector switch 25.

The relay 107 is provided with a pair of movable relay arms 112, 113, which are adapted to be operated in unison by means of the actuating coil 108, and which are connected, respectively, by means of wires 116, 117, to an input transformer 114 and to an output transformer 115 of the amplifier 98.

When the relay coil 108 is inactive, the relay arm 112 will engage a relay contact 118 which is connected to the microphone wire 99 by means of a wire 119, thus connecting the transducer unit 40 as a microphone to the input transformer 114. At the same time, the relay arm 113 will engage a relay contact 120, which is connected to a recording head 121 by means of a wire 122, thus connecting said recording head to the output transformer 115.

The circuit through the transducer unit 40 and the input transformer 114 is completed through a conductor 123, which is connected to the microphone wire 100, and which has a branch 124 connected to the input transformer 114, while the circuit through the output transformer 115 and the recording head 121 is completed through the conductor 123 and branches 125, 126.

In order to energize the indicator lamp 45 when the transducer unit 40 is connected for operation as a microphone, the relay 107 is provided with a third movable relay arm 127, which is disposed in engagement with a relay contact 128 when the relay actuating coil 108 is inactive. The relay arm 127 is adapted to be connected to the wire 111 through a wire 127a, a switch arm 85', a contact 86', and a wire 129, while the relay contact 128 is connected to the lamp wire 106 by means of a wire 130, whereby the indicator lamp 45 may be connected with the source of rectified alternating current through the wires 110, 111. A mechanical connection 88 is provided between the switch arm 85' and the recording head 121, and it will be understood that said connection 88 will operate to hold the indicator lamp circuit open when the recording head 121 is not operatively engaged with the record.

The relay 107 also includes a pair of relay contacts 131, 132 which are adapted to be engaged by the relay arms 112, 113, respectively, when the relay coil 108 is energized by means of the selector switch 25. The relay contacts 131, 132 are connected respectively to a playback head 133 by means of a wire 134, and to the wire 119 by means of a branch wire 135.

A circuit is adapted to be completed through the playback head 133 by means of a branch wire 136 connecting said playback head to the conductor 123. Thus, when the relay coil 108 is energized, the transducer unit 40 will be connected as a reproducer to the output transformer 115, while the playback head 133 will be connected to the input transformer 114.

The relay arm 127 is, of course, connected for simultaneous movement with the relay arms 112, 113, so that when the transducer unit 40 is connected for operation as a reproducer, the indicator lamp 45 will be extinguished, thus warning the operator that the dictating machine 97 is not in condition for recording dictation.

The dictating machine 97 is also provided with a motor 137 for operating a turntable or other record-driving member, and a relay 138 which is connected to the motor switch 23 for controlling said motor. The motor 137 is adapted to be supplied with current from any suitable source by means of wires 139, 140, and is connected in series with a movable relay arm 141 and a relay contact 142 in the relay 138. The contact 142 is connected to the motor by means of a wire 143, while the relay arm 141 is connected to the wire 140. The relay 138 also comprises an actuating coil 144, which is connected at one side to the wire 111, and at its other side to the wire 104 by means of a wire 145. Thus, when the motor switch 23 is operated to close the circuit through the relay coil 144, the relay arm 141 will engage the contact 142 so as to energize the turntable motor 137.

*Operation*

When the instrument 10 and the dictating machine 97 are in condition for operation, the operator may dictate after first pressing the actuating lever 28 inwardly to the position shown in Fig. 9.

The inward movement of the lever 28 will, of course, depress the operating button 24 so as to engage the motor switch arm 67 with the contact 68, thus energizing the motor relay 138, which in turn will energize the turntable motor 137.

The selector switch arm 58 will be separated from the contact 63 so that the coil 108 of the relay 107 will be inactive, and the relay arms 112, 113 and 127 will be in the position shown in Fig. 13, wherein the indicator lamp 45 will be illuminated, the transducer unit 40 will be in operation as a microphone, and the recording head 121 will be actuated. If the operator should desire to continue dictation without the necessity for manually-holding the actuating lever 28, he will, of course, slide said lever upwardly into the latched position shown in Fig. 10.

If the operator should now desire to play back any portion of the recorded material, he will slide the actuating lever 28 downwardly to the position shown in Fig. 11, while holding it pressed inwardly, whereupon the selector switch button 26 will be depressed so as to engage the switch arm 58 with the contact 63 and thus energize the relay coil 108. This will result in a downward movement of the relay arms 112, 113, thus connecting the transducer unit 40 as a reproducer, and placing the playback head 133 in operation.

Simultaneously with the downward movement of the relay arms 112, 113, the relay arm 127 will be separated from the contact 128, thus extinguishing the indicator lamp 45 and warning the operator that the dictating machine is not in condition to receive dictation.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a phonographic apparatus, a dictating machine having a recording amplifier, a playback amplifier, and a record driving motor; a hand control instrument connected to said dictating machine by a cable, said instrument having a transducer unit, operable either to change sound energy to sound modulated electrical energy or to change sound modulated electrical energy to sound energy, a selector switch for connecting said transducer unit selectively to the input of said recording amplifier or to the output of said playback amplifier, a motor switch for controlling said motor, and a single manually-operable lever for actuating both of said switches.

2. In a phonographic apparatus, a dictating machine having a recording amplifier, a playback amplifier, and electrical means for rotating a sound record, a hand control instrument connected to said dictating machine by a cable, said instrument having a transducer unit, operable either to change sound energy to sound modulated electrical energy or to change sound modulated electrical energy to sound energy, a selector switch for connecting said transducer unit selectively to the input of said recording amplifier or to the output of said playback amplifier, a switch for controlling said means, an indicator lamp, and means comprising a switch arm connected in said selector switch for energizing said indicator lamp.

3. In a phonographic apparatus, a dictating machine having an amplifier and a record driving motor, a hand control instrument connected to said dictating machine by a cable, said instrument having a transducer unit, operable either to change sound energy to sound modulated electrical energy or to change sound modulated electrical energy to sound energy, a selector switch, a motor switch for controlling said motor, and a common lever for actuating said switches, and means for connecting said transducer unit selectively to the output or to the input of said amplifier comprising a relay having a coil in circuit with said selector switch.

4. The invention as defined in claim 3, including an indicator lamp in said control instrument, and means including a switch arm in said relay for energizing said indicator lamp.

5. In a phonographic apparatus, a dictating machine comprising record driving means, recording means comprising a recording head movable into and out of operating position with respect to a sound record, and playback means, including circuits extending outwardly of said machine to a portable control instrument having an indicator lamp, said circuits having within said instrument a switch for operating said record driving means, means for energizing said lamp, a selector switch for operating either said recording means or said playback means, means connected to said selector switch for energizing said indicator lamp when said recording means is in operating condition and incapacitating said lamp when said recording head is in inoperative position with respect to said record.

6. In a phonographic apparatus, a portable hand microphone instrument having a transducer unit, operable either to change sound energy to sound modulated electrical energy or to change sound modulated electrical energy to sound energy, a longitudinally slidable and inwardly swingable actuating lever, a selector switch operable by sliding movement of said lever, and a motor switch operable by swinging movement of said lever, and a dictating machine having a recording head, a playback head, a record driving motor, means responsive to operation of said selector switch for operatively connecting said transducer unit selectively to said playback head or to said recording head, and means responsive to the operation of said motor switch for energizing said motor, whereby selective operation of said recording and playback heads and operation of said motor may be controlled solely by movement of said actuating lever.

7. The invention as defined in claim 6, wherein said microphone instrument includes an indicator lamp, and said phonographic apparatus includes means depending upon an operative condition of said recording head for energizing said lamp.

8. In a dictating machine, an amplifier, a recording head, a playback head, a pair of transducer terminals, a pair of selector switch terminals, and a relay comprising switch arms for selectively connecting said transducer terminals to the input of said amplifier and said recording head to the output of said amplifier, or connecting said transducer terminals to the output of said amplifier and said playback head to the input of said amplifier, said relay having an actuating coil connected to said selector switch terminal.

9. In a disk record dictating machine, a recording amplifier, a playback amplifier, a recording head connected to the output circuit of said recording amplifier, a playback head connected to the input circuit of said playback amplifier, a disk record turntable motor, a transducer operable either as a microphone or a loudspeaker, a first circuit means interconnecting said transducer with the input circuit of said recording amplifier, a normally closed switch in said first circuit, a second circuit means interconnecting said transducer with the output circuit of said playback amplifier, a normally open switch in said second circuit, an energizing circuit means for said turntable motor, a normally open motor switch in said energizing circuit means, and a manually controllable lever operative selectively at a first position to close said motor switch and at a second position to simultaneously open said normally closed switch, close said normally open switch, and close said motor switch.

10. The invention as defined in claim 9 including a normally open indicator switch, mechanical means interconnecting said recording head and said indicator switch operative to close said indicator switch when said recording head is in recording position on a disk record, an indicator lamp, a source of electrical power for energizing said recording and playback amplifiers, an energizing circuit for said lamp controlled by said source of electrical power, a normally closed indicator switch in said lamp energizing circuit, and means operable to open said normally closed indicator switch upon operation of said manually controlled lever at its second position.

11. In a disk record dictating machine, a combination recording and playback amplifier, a recording head, a playback head, a disk record turntable motor, a transducer operable either as a microphone or a loudspeaker, circuit means interconnecting said recording head, playback head, amplifier, and transducer operable selectively either to record through said transducer, amplifier, and recording head, or play back through said playback head, amplifier, and transducer, relay means to control said selective interconnecting circuit means, an energizing circuit for said relay means, a first normally open switch in said energizing circuit, an energizing circuit for said turntable motor, a second normally open switch in said motor energizing circuit, and a manually controllable lever operable selectively at a first position to close said second normally open switch and at a second position to simultaneously close respectively said first and second normally open switches.

12. The invention as defined in claim 11 including a normally open indicator switch, mechanical means interconnecting said recording head and said indicator switch operative to close said indicator switch when said recording head is in recording position on a disk record, an indicator lamp, a source of electrical power for energizing said combination recording and playback amplifier, an energizing circuit for said lamp controlled by said source of electrical power, a normally closed indicator switch in said lamp energizing circuit, and means operable to open said normally closed indicator switch upon operation of said manually controlled lever at its second position.

ANTHONY C. DE NAPOLI, Jr.

REFERENCES CITED

The following references are of record in the file of this patent:

UNITED STATES PATENTS

| Number | Name | Date |
|---|---|---|
| 2,219,030 | Curtis | Oct. 22, 1940 |
| 2,305,681 | Dunning | Dec. 22, 1942 |
| 2,328,941 | Anderson | Sept. 7, 1943 |
| 2,375,525 | Clausen | May 8, 1945 |
| 2,409,520 | Thompson | Oct. 15, 1946 |
| 2,485,278 | Gilman | Oct. 12, 1949 |